US005539472A

United States Patent [19]
Aoki

[11] Patent Number: 5,539,472
[45] Date of Patent: Jul. 23, 1996

[54] WAVEFORM ANALYZER FOR SEPARATING AN EIGHT FIELD SEQUENCE OF A PAL VIDEO SIGNAL

[75] Inventor: Jun Aoki, Fujisawa, Japan

[73] Assignee: Matsushita Electric Industrial Co., Ltd., Osaka, Japan

[21] Appl. No.: 302,186

[22] Filed: Sep. 8, 1994

[30] Foreign Application Priority Data

Oct. 29, 1993 [JP] Japan .................................. 5-272388

[51] Int. Cl.⁶ ............................ H04N 9/455; H04N 9/465
[52] U.S. Cl. ............................ 348/506; 348/509; 348/527
[58] Field of Search ..................................... 348/526, 527, 348/194, 506, 509; 358/19, 20; H04N 9/465, 9/455, 17/02

[56] References Cited

U.S. PATENT DOCUMENTS

| 4,337,477 | 6/1982 | Sagishima et al. | 348/509 |
| 5,068,717 | 11/1991 | Jenison | 348/506 |

FOREIGN PATENT DOCUMENTS

| 2723949 | 11/1978 | Germany | 358/20 |
| 62-19118 | 5/1980 | Japan | H04N 9/39 |
| 0496491 | 3/1992 | Japan | H04N 9/465 |
| 4-96491 | 3/1992 | Japan | H04N 9/465 |

Primary Examiner—Safet Metjahic
Assistant Examiner—Jeffrey S. Murrell
Attorney, Agent, or Firm—Spencer & Frank

[57] ABSTRACT

An input signal is inputted to an A/D converter through an amplifier and is converted into a digital input signal. A vertical synchronizing pulse and a horizontal synchronizing pulse are taken out of the output signal of the amplifier by means of a TV synchronizing separator and inputted to a trigger gate and selector circuit. A delay timer and a timing control circuit are operated by a selected synchronizing pulse, and the data applied with A/D conversion are stored in a memory in accordance with a set delay time and sampling synchronization. The stored data are read by means of a CPU circuit. The state of a burst signal is decided by the CPU circuit, and separation of eight fields is performed by combining that state with a set state of the TV synchronizing separator.

6 Claims, 6 Drawing Sheets

| FIELD NO. | ODD-NUMBERED / EVEN-NUMBERED FIELD | EXISTENCE OF BURST WAVE | PHASE OF BURST WAVE |
|---|---|---|---|
| 1st | ODD NUMBER | NONE IN 6Hth LINE | 7Hth LINE ↑ |
| 2st | EVEN NUMBER | PRESENT IN 319Hth LINE | 320Hth LINE ↑ |
| 3st | ODD NUMBER | PRESENT IN 6Hth LINE | 7Hth LINE ↓ |
| 4st | EVEN NUMBER | NONE IN 319Hth LINE | 320Hth LINE ↓ |
| 5st | ODD NUMBER | NONE IN 6Hth LINE | 7Hth LINE ↓ |
| 6st | EVEN NUMBER | PRESENT IN 319Hth LINE | 320Hth LINE ↓ |
| 7st | ODD NUMBER | PRESENT IN 6Hth LINE | 7Hth LINE ↑ |
| 8st | EVEN NUMBER | NONE IN 319Hth LINE | 320Hth LINE ↑ |

\* THE PHASE OF BURST WAVE IS SHOWN WITH RELATIVE VALUE WITH PHASE OF 1ST FIELD AS REFERENCE

WAVEFORM ANALYZER FOR SEPARATING AN EIGHT FIELD SEQUENCE OF A PAL VIDEO SIGNAL

BACKGROUND OF THE INVENTION

1. Field of the Invention

The present invention relates to a waveform analyzer capable of separating an eight field sequence of a phase alternation by line (PAL) video signal and accumulating data of an optional field in accordance with an internal setting.

2. Description of the Related Art

Conventionally, in a waveform analyzer of this type, an input signal is converted into a digital signal by means of an A/D converter. Further, the input signal is inputted to a TV synchronizing signal separator which is constructed so that an odd-numbered field can be separated from an even-numbered field by detecting a difference among serrated pulses at a starting point of vertical synchronization of a video signal (the input signal). The TV synchronizing signal separator outputs vertical synchronizing pulses for every odd-numbered field or even-numbered field in accordance with an internal setting determined by a state setting of the analyzer by a user from a panel surface, a GP-IB interface or the like of the analyzer. Further, the TV synchronizing signal separator separates horizontal synchronizing signals of the input signal and outputs the horizontal synchronizing pulses. The vertical synchronizing pulse and the horizontal synchronizing pulse that are outputted from the TV synchronizing signal separator are inputted to a trigger gate and selector circuit, and are selected into a trigger pulse A for starting a delay counter and a trigger pulse B used as a reference for stopping to take in the waveform. The delay counter and a timing control circuit for controlling a memory are started by means of the trigger pulses A and B, thus making it possible to collect field signals in accordance with the internal setting at a desired delay time and sampling period.

However, the conventional waveform analyzer described above has such a problem that, although it is possible to decide to which field, either an odd-numbered field or an even-numbered field, the accumulated data belong for an input signal having a plurality of field sequences such as a PAL video signal, it is impossible to decide the number of the field to which the data belong.

As a method of detecting a color field of a PAL video signal, a method of detecting a color field by adding one of a plurality of phase angles, which are predetermined respectively based on the mode of combination of a result of detecting whether it is an odd-numbered field or an even-numbered field and a result of detecting the existence of a burst signal belonging to a horizontal synchronizing pulse immediately after an equivalent pulse, to a subcarrier-to-horizontal phase (SCH phase) detected separately, and depending on whether the phase value obtained by the addition belongs to a range of 270° to 90° or a range of 90° to 270° has been disclosed in JP-A-4-96491. However, this method of detection has such a problem that the color field cannot be detected when the phase value obtained by the addition reaches 90° and 270°, i.e., there are two undetectable points.

SUMMARY OF THE INVENTION

The present invention is for solving problems of the conventional waveform analyzer described above, and has for its object to provide a waveform analyzer capable of surely accumulating data of decided fields 1 to 8 in accordance with an internal setting when a PAL video signal is observed.

In order to achieve the object described above, a waveform analyzer of the present invention includes an amplifying means for amplifying a video input signal; an A/D conversion means for converting the video input signal amplified by the amplifying means into a digital input signal; a memory means for storing the digital input signal outputted from the A/D conversion means; a TV synchronizing separating means for taking out vertical synchronizing pulses and horizontal synchronizing pulses from the video input signal amplified by the amplifying means, outputting the taken out vertical synchronizing pulses for each odd-numbered field or even-numbered field in accordance with an internal setting, and also outputting the taken out horizontal synchronizing pulses consecutively; a trigger gate and selector means for selecting the vertical synchronizing pulse and the horizontal synchronizing pulse, which are outputted from the TV synchronizing separating means, into a first trigger signal and a second trigger signal, and also performing gate processing of the first trigger signal and the second trigger signal; a delay timer means for counting a period of time corresponding to a set delay period of time synchronously with the first trigger signal outputted from the trigger gate and selector means; a timing control means for performing control of the gate processing by the trigger gate and selector means and also performing read control and write/read address control of the memory means in accordance with an output signal of the delay timer means and the second trigger signal outputted from the trigger gate and selector means; and an arithmetic means for reading the digital input signal stored in the memory means and performing detection of the existence of a burst signal included in the digital input signal and computation of a phase, thereby to detect a color field of the video input signal.

Thus, the present invention has an effect such that when a PAL video signal is observed, data in the fields 1 to 8 meeting a desire can be accumulated surely by adopting monitoring of a state of a burst signal by the arithmetic means in addition to separation of odd-numbered/ even-numbered fields from each other by conventional hardware (TV synchronizing signal separating means).

DESCRIPTION OF THE PREFERRED EMBODIMENTS

Figure 1:
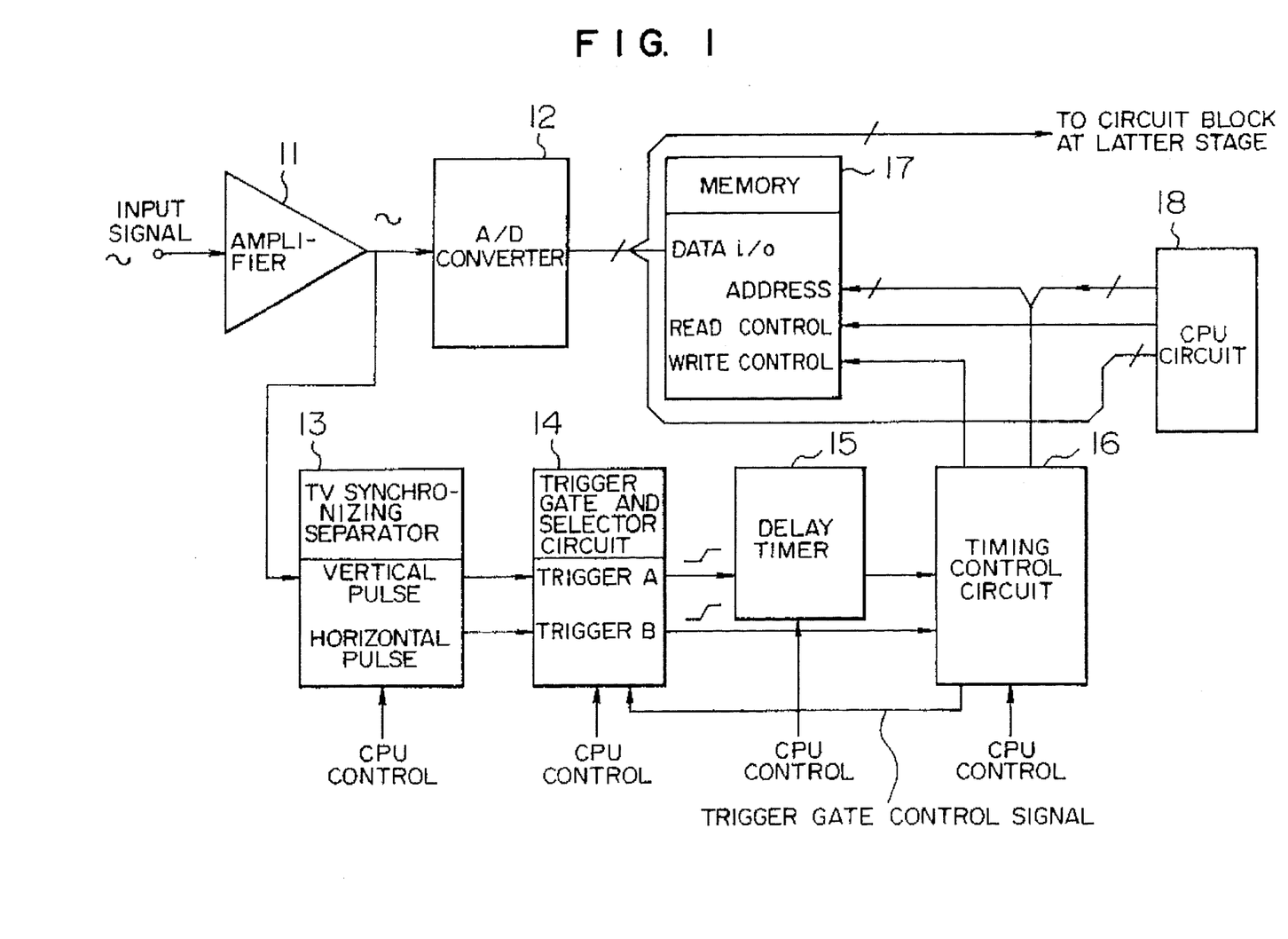
FIG. 1 is a block diagram of a waveform analyzer according to a first embodiment of the present invention.
Figure 2A:
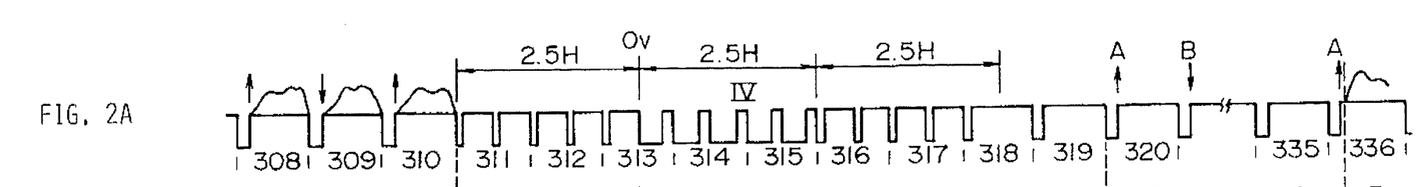
FIGS. 2A–2D are signal waveform diagram showing a PAL video signal.
Figure 2B:
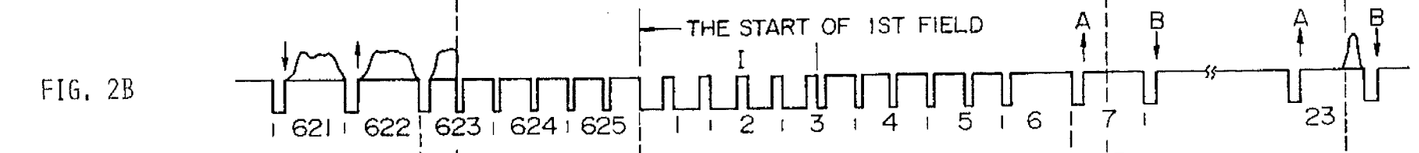
Figures 2C, 2D:
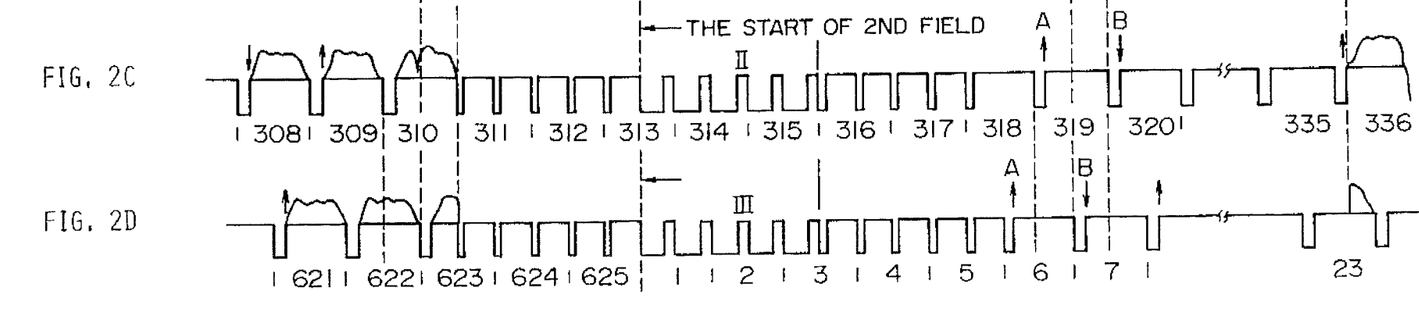

As shown in FIG. 1, a waveform analyzer according to a first embodiment of the present invention includes an amplifier 11 for amplifying an input signal (a PAL video input signal), an A/D converter 12 for converting the input signal amplified by the amplifier 11 into a digital input signal, a memory 17 for storing the digital input signal outputted from the A/D converter 12, a TV synchronizing separator 13 for taking out vertical synchronizing pulses and horizontal synchronizing pulses of the input signal amplified by the amplifier 11, outputting the taken out vertical synchronizing pulses for every odd-numbered field or even-numbered field in accordance with an internal setting, and outputting the taken out horizontal synchronizing pulses consecutively, a trigger gate and selector circuit 14 for selecting the vertical synchronizing pulse and the horizontal synchronizing pulse, which are outputted from the TV synchronizing separator 13, into a trigger pulse A (a first trigger signal) and a trigger pulse B (a second trigger signal) and also performing gate processing of the trigger pulse A and the trigger pulse B, a delay timer 15 for counting a period of time corresponding to a set delay period of time synchronously with the trigger pulse A outputted from the trigger gate and selector circuit 14, a timing control circuit 16 for performing control of gate processing of the trigger gate and selector circuit 14 and also performing write control and write/read address control of the memory 17 in accordance with the output signal of the delay timer 15 and the trigger pulse B outputted from the trigger gate and selector circuit 14, and a CPU circuit 18 for reading the digital input signal stored in the memory 17 and performing detection of existence and phase computation of a burst signal included in the digital input signal, thereby to detect a color field of the input signal. Besides, the TV synchronizing separator 13, the trigger gate and selector circuit 14, the delay timer 15, and the timing control circuit 16 are controlled by means of the CPU circuit 18.

Next, the operation of the waveform analyzer according to the first embodiment will be described. The amplifier 11 amplifies the input signal so as to adapt the amplitude of the input signal to the input signal level of the A/D converter 12. The input signal amplified by the amplifier 11 is transmitted to the A/D converter 12 and the TV synchronizing separator 13. The A/D converter 12 converts the amplified input signal into a digital input signal. The TV synchronizing separator 13 takes vertical synchronizing pulses and horizontal synchronizing pulses out of the amplified input signal. At this time, the vertical synchronizing pulses are outputted from the TV synchronizing separator 13 for every odd-numbered field or even-numbered field in accordance with an internal setting. On the other hand, the horizontal synchronizing pulses are outputted from the TV synchronizing separator 13 consecutively without discrimination between the odd-numbered field and the even-numbered field. The vertical synchronizing pulse and the horizontal synchronizing pulse are transmitted to the trigger gate and selector circuit 14 at a latter stage. The trigger gate and selector circuit 14 selects the vertical synchronizing pulse and the horizontal synchronizing pulse into a trigger pulse A (a start signal of the delay timer 15) and a trigger pulse B (a reference signal for stopping taking-in of a waveform), respectively, in accordance with the internal setting of the analyzer, and also transmits the trigger pulse A and the trigger pulse B gate-permitted by a trigger gate control signal from the timing control circuit 16 to the delay timer 15 and the timing control circuit 16 at a latter stage. When the trigger pulse A becomes active, the delay timer 15 starts to count the period of time corresponding to the set delay period of time, and transmits a count terminating pulse to the timing control circuit 16 after counting the period of time. When this count terminating pulse is received at time of free run mode that is a mode for seizing the input signal immediately after the lapse of the set delay period of time, the timing control circuit 16 transmits a write control signal and an address signal to the memory 17 so as to promptly write a digital input signal outputted from the A/D converter 12. When the digital input signal is written in the memory 17 by the portion of predetermined numbers of data, the timing control circuit 16 terminates the write operation. Further, when a delay period of time count terminating pulse is received the time of B trigger mode, that is, a mode for seizing the input signal with the trigger pulse B as a reference after performing trigger signal wait again after the lapse of the set delay period of time, the timing control circuit 16 performs processing of permitting reception of the trigger B, and makes the digital input signal outputted from the A/D converter 12 to be written in the memory 17 by the portion of predetermined numbers of data with the trigger pulse B as a reference after the trigger pulse B is received, thus completing a write sequence. Besides, the pulse output having a set sampling period width, the write sequence or the like are all controlled by the timing control circuit 16. The data written in the memory 17 are transmitted to a circuit block at a latter stage. When a display control circuit and a display are connected as the circuit block at the latter stage, waveform display becomes possible. Further, it is possible to apply various processings to the taken in data by additionally installing a random access memory circuit at the latter stage. In either case, data transfer is made to the circuit at the latter stage of the memory 17. All the data loaded in the memory 17 can be read by the CPU circuit 18, and it is possible for the CPU circuit 18 to obtain various information from the read out data.

Next, a method of realizing PAL eight field separation will be described. The PAL video signal has a sequence of eight fields when phase information of the burst wave is considered, and triggers are generated in the fields 1, 3, 5, and 7 and in the fields 2, 4, 6, and 8 in ordinary separation between odd-numbered and even-numbered fields. It becomes possible to confirm and discriminate eight fields when information of the burst wave is considered by software treatment through the CPU circuit 18 in addition to the separation between the odd-numbered and even-numbered fields by means of the TV synchronizing separator 13 shown in FIG. 1.

Figure 3:
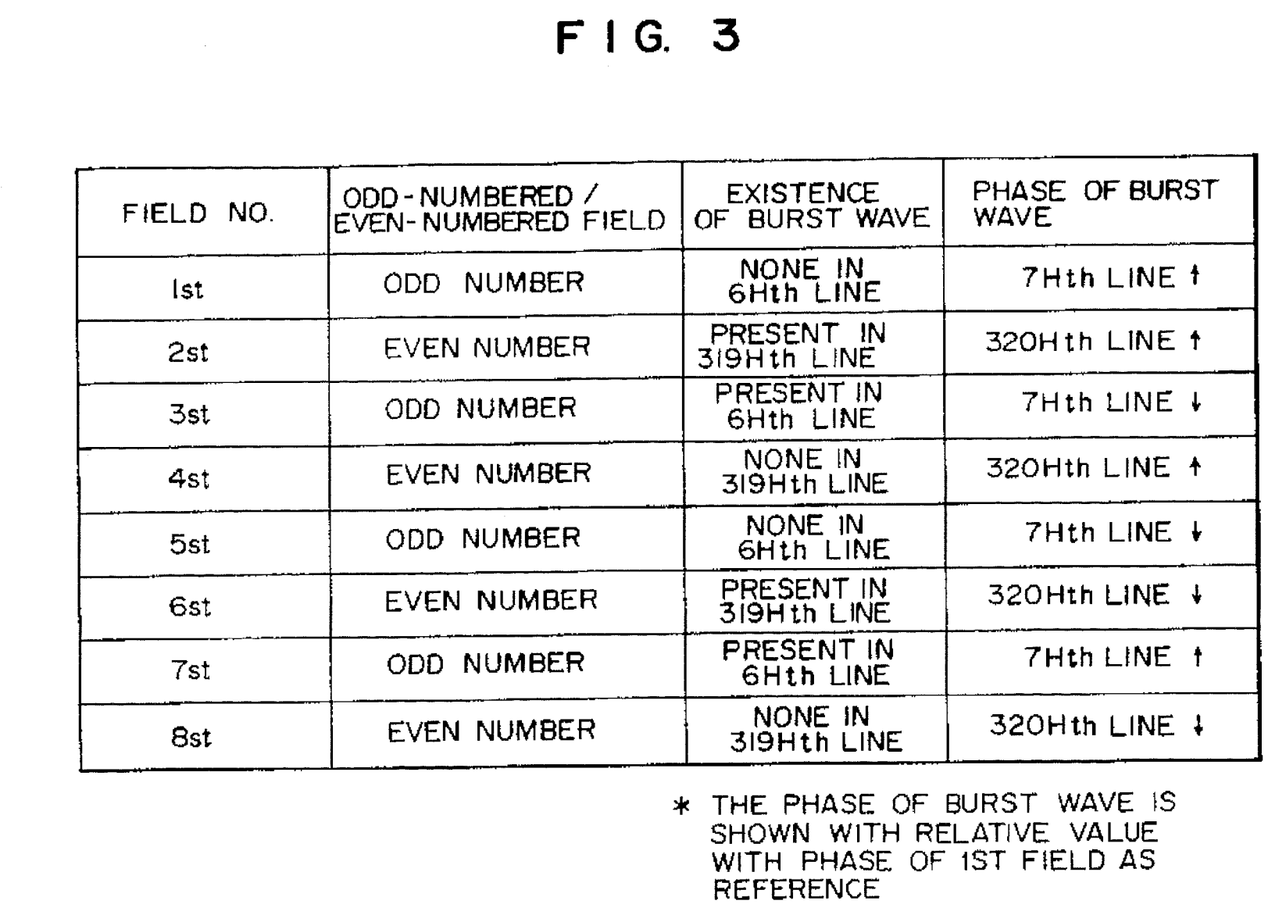
FIG. 3 is a synoptic table showing conditions for separating eight fields of a PAL video signal.

FIGS. 2A–2D are waveform diagrams showing four field portions of the PAL video signal. When the phase of the burst wave is not taken into consideration, the PAL video signal is conceivable as four fields as shown in FIGS. 2A–2D. Thus, the first field I (FIG. 2B) and the third field III (FIG. 2D) are distinguished from each other depending on whether a burst wave exists in the sixth line or not. Similarly, the second field II and the fourth field IV are distinguished from each other depending on a fact whether a burst wave exists in the 319th line or not. It is possible to separate the signal into four sets, (the first and the fifth), (the second and the sixth), (the third and the seventh), and (the fourth and the eighth) from these information. Furthermore, since there is such a feature in the PAL video signal that the phases of burst waves are shifted by 180 degrees when lines having the same number are watched in the first field and the fifth field when the set of (the first and the fifth) are looked at for instance, it becomes possible to separate the eighth field from the first field when the phase information of the burst wave is obtainable. The matters described above are put together in FIG. 3.

Next, a method of realizing PAL eight field separation using the structure shown in FIG. 1 will be described. The present invention is featured in that, when a user selects signal observation of the nth field (n: an integer), the (n-2)th field is recognized in advance, thereby to make taking-in of the input signal of the nth field by the next trigger effective. Since the way of application of the trigger is determined uniformly (the order of 1, 3, 5, and 7 at time of odd-numbers and 2, 4, 6, and 8 at time of even-numbers) by separating odd-numbered/even-numbered fields from each other by means of the TV synchronizing separator 13, it is effected that, when the field taken in by a certain trigger is the (n-2)th field, an input signal taken in by a trigger arriving in the next place is the input signal of the nth field. In order to recognize the field in advance, a waveform (an input signal) taking-in cycle is executed with a dummy only for the purpose of field decision and the data are stored in the memory 17. The data are read out of the memory 17 by means of the CPU circuit 18, and it is decided by software treatment to which field the taken in waveform belongs so as to control the next waveform taking-in cycle in accordance with the result of the decision. Besides, the taking-in cycle of the dummy means that, when the analyzer has a waveform display function for instance, although the waveform is taken into the memory 17 practically, the waveform is not displayed, but the taken in data are used only for the purpose of field decision.

Figure 4:
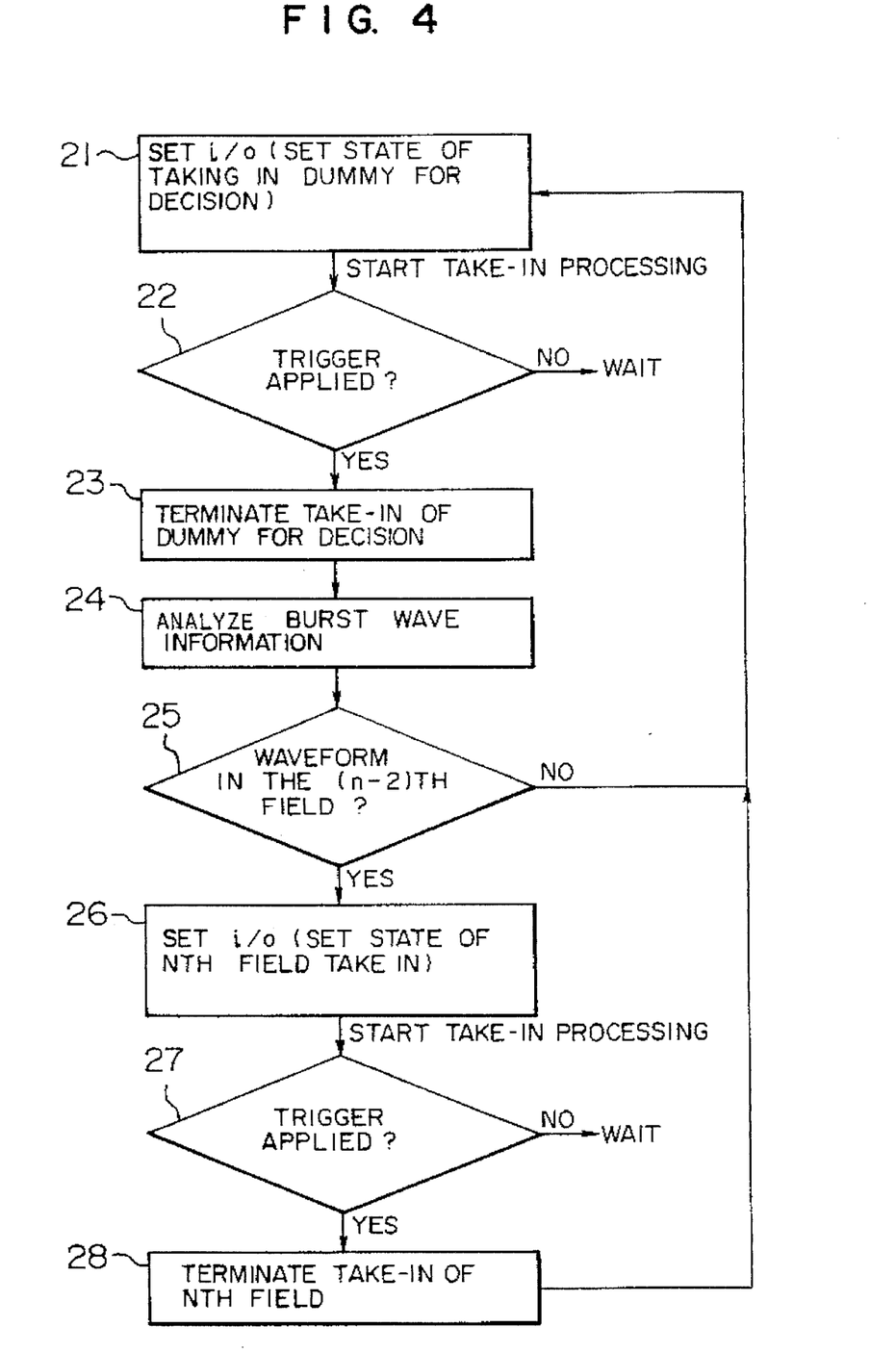
FIG. 4 is a flow chart showing an algorithm of waveform taking-in processing in the first embodiment of the present invention.

FIG. 4 shows an algorithm of waveform taking-in processing in the present embodiment. First, in a step 21, a state of taking in a dummy for decision is set and taking-in processing is started. Next, it is checked in a step 22 whether triggers by a vertical synchronizing pulse and a horizontal synchronizing pulse outputted from the TV synchronizing separator 13 have been applied or not. When triggers have not been applied, the application thereof is waited for, and, when they have been applied, the dummy for decision is taken in in a step 23, thus completing the taking-in processing. Then, the burst wave information is analyzed in a step 24. When a user selects observation of the nth field, the taking-in cycle of the dummy for decision is repeated in a step 25 until the (n-2)th field is detected. When the (n-2)th field is detected, after the state of taking in the nth field is set in a step 26, it is checked in a step 27 whether the trigger has been applied or not. When the trigger has been applied, the nth field is taken in in a step 28, and the process is returned to the step 21. As a result, it becomes possible for a user to observe the input signal of the nth field under optional conditions of observation.

It is required to set the taking-in conditions of a waveform for field decision so that the existence and the phase of the burst signal may be analyzed by taking in the waveform one time. A synchronizing pulse signal (a vertical synchronizing pulse) and a horizontal synchronizing pulse signal of the odd-numbered or the even-numbered field are taken out by the TV synchronizing separator 13, and the vertical synchronizing pulse is selected into a trigger pulse A and the horizontal synchronizing pulse is selected into a trigger pulse B by the trigger gate and selector circuit 14. Through this setting, the taking-in of the dummy for decision is started by the horizontal synchronizing pulse outputted from the trigger gate and selector circuit 14 after the lapse of delay period of time that is set in the delay timer 15 from the position of the odd-numbered or the even-numbered vertical synchronizing pulse. Since one line period is 64 µS in the PAL video signal, when decision of the odd-numbered field is made, it is possible to store the burst signals in the 6th line and the 7th line in the memory 17 in a taking-in cycle once when the trigger B is applied in the 6th line and a waveform taking-in cycle in 72 µS or more is executed therefrom. Through the control by the timing control circuit 16, after the waveform taking-in cycle is stopped, the data stored in the memory 17 are read by the CPU circuit 18, the information of the burst signals in the 6th line and the 7th line is analyzed, and the field number of the taken in input signal is recognized. As a result, it is possible to decide whether the waveform taking-in cycle started by the vertical synchronizing pulse outputted from the TV synchronizing separator 13 in the next place is valid or invalid.

An example of setting when the set field is an odd-numbered field will be shown hereunder.

| | |
|---|---|
| Vertical field separation | an odd number |
| Delay period of time | 5.7 H |
| Sweep mode | B TRIG mode |
| Taking-in period of time | 100 µS |
| Sampling period | 10 nS |

Figure 5:
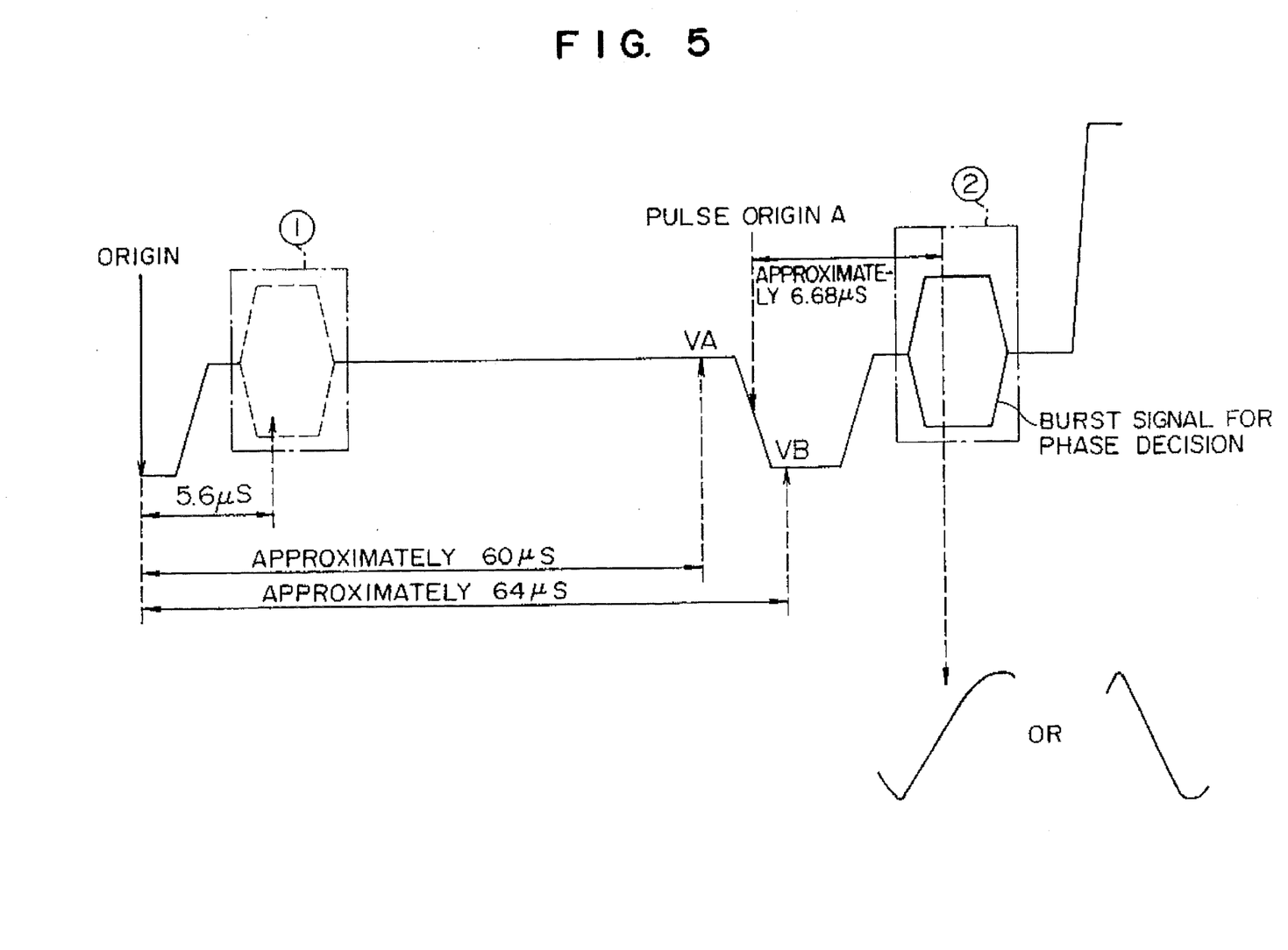
FIG. 5 is a typical diagram showing an example of taking in a dummy for field decision in the first embodiment of the present invention.

Through the setting described above, the data required for deciding the existence of the 6Hth burst signal and the phase of the 7Hth burst signal are stored in the memory 17 by taking in the dummy once. FIG. 5 shows the data stored in the memory 17. The data separated by 5.6 µS from the head data (a point of origin) of the memory 17 are retrieved by the CPU circuit 18, and the existence of the burst signal is decided from that part ①. Further, voltage values of the data separated from the head data by approximately 60 µS and 64 µS are assumed to be VA and VB, and a point crossing the voltage value of (VA+VB)/2 is retrieved by the CPU circuit 18, which is adopted as a pulse point of origin A. Then, the phase information of the burst signal is read from a part ② separated from the pulse point of origin A by 6.68 µS and the phase information is combined with the information decided previously. Thereby, the CPU circuit 18 is able to recognize the field number.

With the foregoing, according to the waveform analyzer of the present embodiment, it is possible to separate the eight field sequence of the PAL video signal and to accumulate the data of an optional field surely in accordance with the setting by the user.

Figure 6:
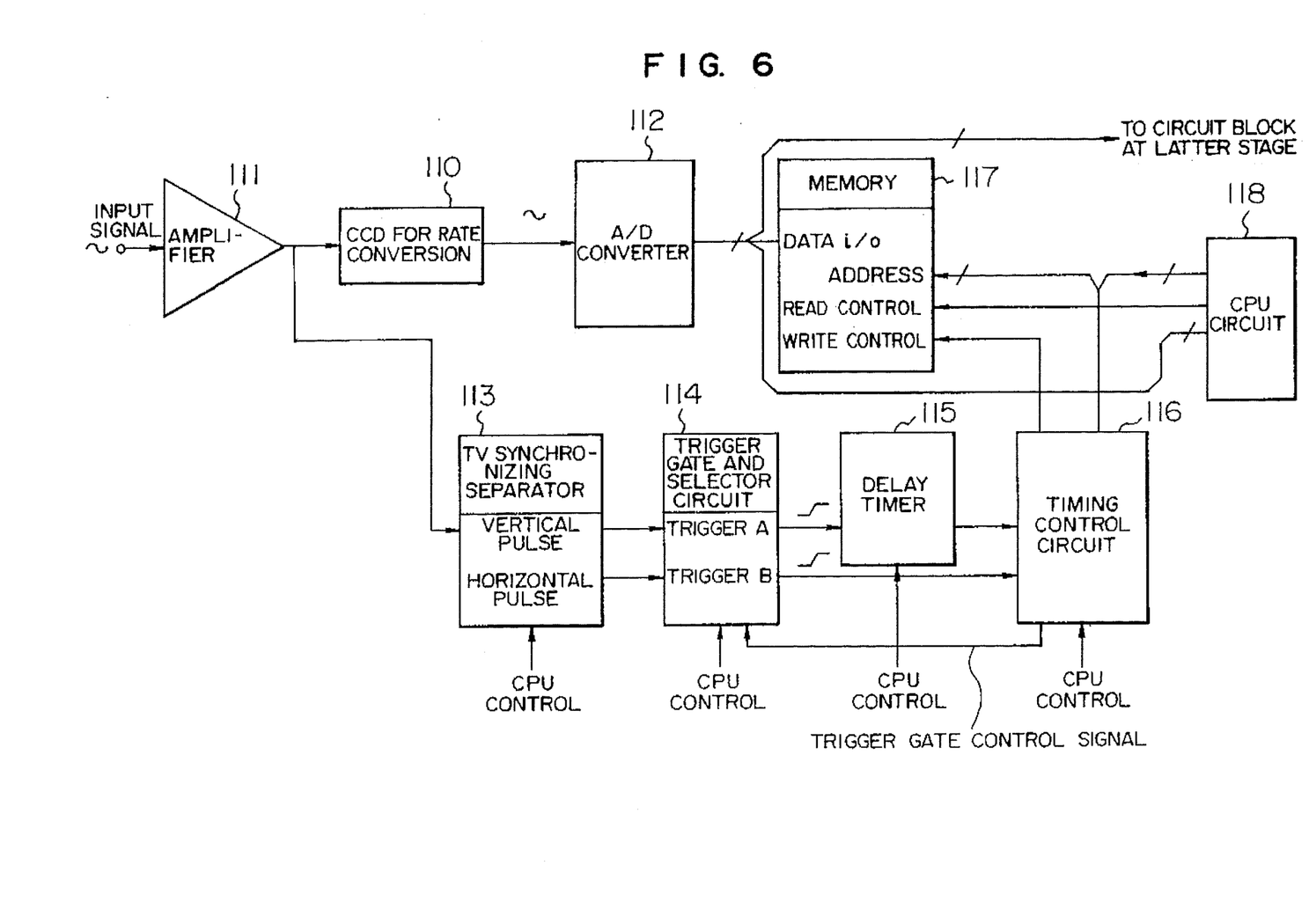
FIG. 6 is a block diagram of a waveform analyzer according to a second embodiment of the present invention.

A waveform analyzer according to a second embodiment of the present invention is different from the waveform analyzer according to the first embodiment of the present invention shown in FIG. 1 in that a charge coupled device (CCD) 110 for rate conversion of an input signal (a PAL video input signal) is provided between an amplifier 111 and an A/D converter 112 as shown in FIG. 6. Namely, in the waveform analyzer according to the present embodiment, the input signal is inputted to the amplifier 111 thereby to be amplified to a predetermined level and is inputted thereafter to the CCD 110 for rate conversion and stored as an analog signal. When input signals in predetermined numbers of data are stored in the CCD 110 for rate conversion, the stored input signals are outputted from the CCD 110 for rate conversion at a lower rate than that at time of input and transmitted to the A/D converter 112. With this, it is possible to have the A/D converter 112 or the like provided at a latter stage than the CCD 110 for rate conversion at a lower rate as compared with the case of the first embodiment. Besides, the operation of the waveform analyzer according to the present embodiment is similar to that of the waveform analyzer according to the first embodiment of the present invention shown in FIG. 1 described previously. Hence, the description thereof is omitted.

What is claimed is:

1. A waveform analyzer comprising:
   means for taking in a video input signal;
   means for extracting information on existence and phase of a burst signal included in said taken-in video input signal; and means for recognizing whether said taken-in video input signal is in an (n-2)th field (n: an integer) or not from said extracted information on existence and phase of the burst signal, and controlling said taking-in means to take in a video input signal in an nth field after recognizing the (n-2)th field.

2. A waveform analyzer according to claim 1, wherein said video input signal is a video input signal of a phase alternation by line system, and a function of separating an eight field sequence of said video input signal of the phase alternation by line system is provided.

3. A waveform analyzer comprising:

an amplifier means for amplifying a video input signal;

an A/D conversion means for converting said video input signal amplified by said amplifying means into a digital input signal;

a memory means for storing said digital input signal outputted from said A/D conversion means;

a TV synchronizing separating means for taking vertical synchronizing pulses and horizontal synchronizing pulses out of said video input signal amplified by said amplifying means, outputting the taken out vertical synchronizing pulses for every odd-numbered field or even-numbered field in accordance with an internal setting which is set in said waveform analyzer before operation thereof, and also outputting the taken out horizontal synchronizing pulses consecutively, said TV synchronizing separating means outputting the taken out vertical synchronizing pulses for every odd-numbered field when said internal setting is set to observe a video input signal in one of the odd-numbered fields and outputting the taken out vertical synchronizing pulses for every even-numbered field when said internal setting is set to observe a video signal in one of the even-numbered fields;

a trigger gate and selector means for selecting said vertical synchronizing pulse and said horizontal synchronizing pulse outputted from said TV synchronizing separating means into a first trigger signal and a second trigger signal, respectively, and also performing gate processing of said first trigger and said second trigger signal;

a delay timer means for counting a time corresponding to a set delay time synchronously with said first trigger signal outputted from said trigger gate and selector means;

a timing control means for controlling said gate processing by said trigger gate and selector means and also performing write control and write/read address control of said memory means in accordance with an output signal of said delay timer means and said second trigger signal outputted from said trigger gate and selector means; and an arithmetic means for reading said digital input signal stored in said memory means and performing detection of existence and computation of a phase of a burst signal included in said digital input signal, thereby detecting a color field of said video input signal.

4. A waveform analyzer according to claim 3, wherein said video input signal is a video input signal of a phase alternation by line system.

5. A waveform analyzer according to claim 3, further comprising a charge transfer element for converting a rate of said video input signal, which is provided between said amplifying means and said A/D conversion means, wherein an output signal of said charge transfer element is transmitted to said A/D conversion means.

6. A waveform analyzer according to claim 5, wherein said video input signal is a video input signal of a phase alternation by line system.

* * * * *